US012036885B2

(12) United States Patent
Woods

(10) Patent No.: US 12,036,885 B2
(45) Date of Patent: Jul. 16, 2024

(54) SYSTEMS, METHODS, AND APPARATUS FOR MANAGEMENT OF ON-DEMAND CHARGING OR DISCHARGING OF ELECTRICAL ENERGY

(71) Applicant: Toyota Motor Engineering & Manufacturing North America, Inc., Plano, TX (US)

(72) Inventor: Brian Woods, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 78 days.

(21) Appl. No.: 17/961,529

(22) Filed: Oct. 6, 2022

(65) Prior Publication Data
US 2024/0116383 A1    Apr. 11, 2024

(51) Int. Cl.
*B60L 53/60*    (2019.01)
*B60L 55/00*    (2019.01)
(Continued)

(52) U.S. Cl.
CPC ............... *B60L 53/60* (2019.02); *B60L 55/00* (2019.02); *B60L 58/12* (2019.02); *H02J 3/322* (2020.01);
(Continued)

(58) Field of Classification Search
CPC .......... B60L 53/60; B60L 55/00; B60L 58/12; H02J 3/322; H02J 7/0045; H02J 7/0048;
(Continued)

(56) References Cited

U.S. PATENT DOCUMENTS 8,493,026 B2    7/2013  Sahinoglu et al.
8,860,362 B2   10/2014  Kamen et al.
(Continued)

FOREIGN PATENT DOCUMENTS

CN    106476650 A    3/2017
KR    102130033 B1    7/2020

OTHER PUBLICATIONS

Atmaja et al., *Energy storage system using battery and ultracapacitor on mobile charging station for electric vehicle*, www.sciencedirect.com, Energy Procedia 68 (2015), pp. 429-437.
(Continued)

*Primary Examiner* — Lincoln D Donovan
*Assistant Examiner* — Alex W Lam
(74) *Attorney, Agent, or Firm* — Snell & Wilmer LLP

(57) ABSTRACT

A system for managing on-demand charging or discharging of electrical energy. The system includes a plurality of energy storage devices, one or more connectors configured to connect with a plug of an external device, a switching device configured to control a connection between the plurality of energy storage devices and the one or more connectors, and an electronic control unit (ECU) coupled to the switching device. The ECU may receive data relating to a first external device and a second external device each requesting an on-demand charging or discharging of electrical energy, determine a first amount and a second amount of electrical energy to be charged to or discharged from, respectively, the first external device and the second external device, and determine whether a service apparatus is capable of the on-demand charging or discharging of electrical energy for the first and the second external devices without requiring additional electrical energy.

20 Claims, 8 Drawing Sheets

(51) Int. Cl.
  *B60L 58/12*   (2019.01)
  *H02J 3/32*    (2006.01)
  *H02J 7/00*    (2006.01)
  *H02J 13/00*   (2006.01)
  *B60W 60/00*   (2020.01)

(52) U.S. Cl.
  CPC .......... *H02J 7/0045* (2013.01); *H02J 7/0048* (2020.01); *H02J 7/00712* (2020.01); *H02J 13/00006* (2020.01); *B60W 60/001* (2020.02)

(58) Field of Classification Search
  CPC ........... H02J 7/00712; H02J 13/00006; B60W 60/001
  See application file for complete search history.

(56) References Cited

U.S. PATENT DOCUMENTS

| | | | |
|---|---|---|---|
| 10,752,125 | B2 | 8/2020 | Chae et al. |
| 2011/0258112 | A1 | 10/2011 | Eder et al. |
| 2019/0138006 | A1* | 5/2019 | Marcial-Simon ....... B60L 53/67 |
| 2020/0101863 | A1* | 4/2020 | Westin ................... B60L 53/57 |
| 2020/0376975 | A1 | 12/2020 | Martin et al. |
| 2021/0031638 | A1 | 2/2021 | Lehmeier et al. |

OTHER PUBLICATIONS

Waleed Ejaz et al, "IoV-Based Deployment and Scheduling of Charging Infrastructure in Intelligent Transportation Systems", IEEE Sensors Journal, vol. 21, No. 14, Jul. 15, 2021, pp. 15504-15514.

Bin Ye et al, "Feasibility Study of a Solar-Powered Electric Vehicle Charging Station Model", www.mdpi.com/journal/energies, Energies 2015, 8, doi: 10.3390/en81112368, pp. 13265-13283.

Shun-Neng Yang et al, "Mobile Charging Station Service in Smart Grid Network", IEE SmartGridComm 2012 Symposium—Smart Grid Services and Management Models, pp. 412-417.

Savio et al., "Development of multiple plug-in electric vehicle mobile charging station using bidirectional converter", International Journal of Power Electronics and Drive System (IJPEDS), vol. 11, No. 2, Jun. 2020, pp. 785-791.

Daniel Fodorean et al, "New Mobile Charging Station for Urban and Resort Areas", EV2019 Electric Vehicles International Conference & Show, www.evshow.ro, Oct. 3-4, 2019, 6 pages.

* cited by examiner

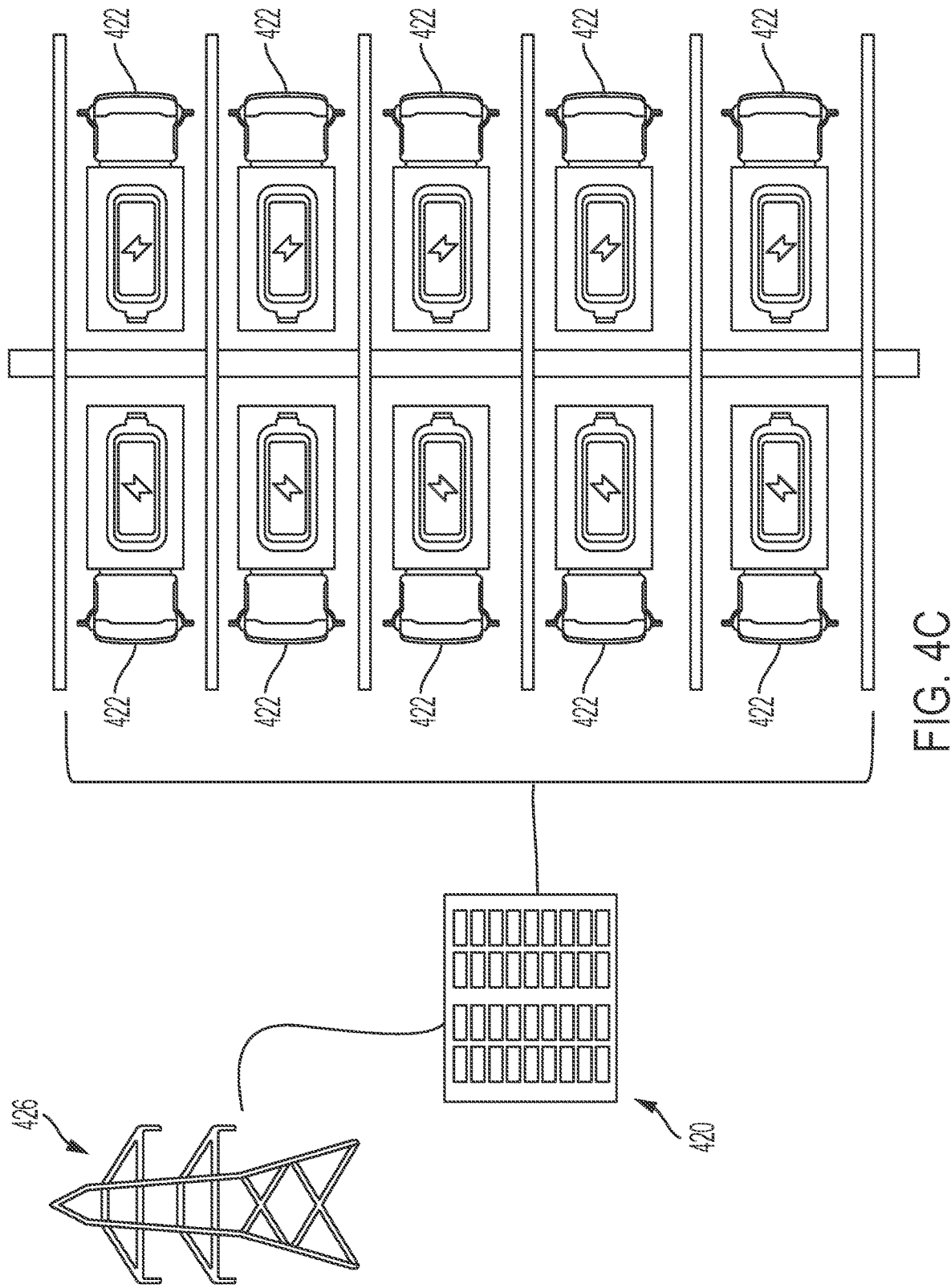

SYSTEMS, METHODS, AND APPARATUS FOR MANAGEMENT OF ON-DEMAND CHARGING OR DISCHARGING OF ELECTRICAL ENERGY

BACKGROUND

Field

The present disclosure is directed to systems, methods, and apparatus for management of on-demand charging or discharging of electrical energy.

Description of the Related Art

Fuel-efficient vehicles (e.g., hybrid, plug-in hybrid, electric, fuel cell vehicles, etc.) continue to gain popularity over the years. Energy storage devices (e.g., batteries) of fuel-efficient vehicles that supply power to their motors (e.g., electric motor, internal combustion engine, and/or the like) to propel the vehicles may also supply power to other components of the vehicles as well as remote devices (e.g., refrigerator, ventilator, music player, speaker, outdoor light, electric stove, smartphone, etc.). Some energy storage devices may even supply power to homes, businesses, and recreational vehicles (RVs). For example, some vehicles (e.g., pick-up trucks, vehicles towing trailers, and/or the like) may use vehicle batteries to supply power to remote devices (e.g., in remote locations, off the electric grid) while a user is participating in recreational outdoor activities such as camping, providing emergency services, working in a construction site, etc.

Several drawbacks exist with a fuel-efficient vehicle which conventionally requires a charging station (e.g., at home, outdoors, etc.) to charge its energy storage device (e.g., a battery). For example, there are not as many charging stations (e.g., quick-charge or fast-charge charging stations) currently available as desired, and a range these vehicles can travel (which sometimes may not be sufficient to go from one location to another) may drop even further when hauling or towing—e.g., hauling load(s) in the vehicle (e.g., in a pick-up truck bed) or towing a trailer (e.g., attached to the vehicle), resulting in a heavier load and a reduced driving range.

Furthermore, the energy storage device of such a fuel-efficient vehicle may need to be upgraded (requiring further cost), e.g., to a more expensive battery (i.e., with a higher capacity and capability) to meet various needs. Moreover, there may be a need to have a battery which can provide a back-up power or an energy source when going off-grid.

Due to such versatile use of batteries as well as an increase in the number of the fuel-efficient vehicles in use (thus requiring more charging stations each of which incurs high CAPEX), a more versatile and efficient way to charge or discharge the batteries (e.g., of vehicles) is desirable, especially when there is an on-demand need for the charging or discharging at various locations (e.g., for emergency or "on-the-go" circumstances). Hence, there is a need for advanced systems, methods, and apparatus to efficiently manage on-demand charging or discharging of electrical energy, e.g., for a fuel-efficient vehicle.

SUMMARY

Described herein is a system for managing on-demand charging or discharging of electrical energy by a service apparatus for a plurality of external devices. The system includes a plurality of energy storage devices configured to store electrical energy, one or more connectors configured to connect with a plug of an external device, a switching device configured to control a connection between the plurality of energy storage devices and the one or more connectors, and an electronic control unit (ECU) coupled to the switching device. The ECU may be configured to receive data relating to a first external device and a second external device each requesting an on-demand charging or discharging of electrical energy. The ECU may also be configured to determine, based on the received data, a first amount of electrical energy to be charged to or discharged from the first external device and a second amount of electrical energy to be charged to or discharged from the second external device. The ECU may also be configured to determine whether the service apparatus is capable of providing the on-demand charging or discharging of electrical energy for the first and the second external devices without requiring any additional electrical energy.

In some embodiments, the ECU is further configured to determine a route for providing the on-demand charging or discharging of electrical energy for the first and the second external devices. The service apparatus is capable of traversing the route without an external power supply. In some implementations, the requests from the first external device and the second external device include a request for an on-demand discharging of electrical energy from at least one of the first external device and/or the second external device. The ECU is further configured to utilize at least a portion of the electrical energy to be discharged from the at least one of the first external device and/or the second external device to power the service apparatus, the portion of the electrical energy enabling the service apparatus to traverse the route without the external power supply. In some implementations, the ECU is further configured to receive a request for an on-demand charging or discharging of electrical energy for at least a third external device to be performed simultaneously as on-demand charging or discharging of electrical energy for at least one of the first external device and/or the second external device. In some embodiments, the system further includes a network access device configured to communicate with a remote device providing one or more instructions related to the on-demand charging or discharging of electrical energy for the first and the second external devices. The ECU is further configured to receive, via the network access device and from the remote device, the one or more instructions related to the on-demand charging or discharging of electrical energy for the first and the second external devices. In some embodiments, the system further includes a plurality of receptacles each removably disposed within the service apparatus. The plurality of energy storage devices include a plurality of stackable energy storage devices, and each of the plurality of receptacles are detachable from one another of the plurality of receptacles and configured to house a respective one of the plurality of stackable energy storage devices. In some embodiments, the system further includes a connector configured to connect with an electric grid. The ECU is further configured to provide, via the connector, electrical energy to the electric grid.

Also described herein is a vehicle for managing on-demand charging or discharging of electrical energy for a plurality of external devices. The vehicle includes a plurality of energy storage devices configured to store electrical energy, one or more connectors configured to connect with a plug of an external device, and a switching device configured to control a connection between the plurality of energy storage devices and the one or more connectors. The vehicle further includes an electronic control unit (ECU) connected to the switching device and configured to receive data relating to a first external device and a second external device each requesting an on-demand charging or discharging of electrical energy, determine, based on the received data, a first amount of electrical energy to be charged to or discharged from the first external device and a second amount of electrical energy to be charged to or discharged from the second external device, determine a state of charge (SOC) of an energy storage device of the vehicle, and determine, based on the first amount of electrical energy, the second amount of electrical energy, and the SOC of the energy storage device of the vehicle, whether the vehicle is capable of providing the on-demand charging or discharging of electrical energy for the first and the second external devices without requiring any additional electrical energy.

In some embodiments, the ECU is further configured to determine a route for providing the on-demand charging or discharging of electrical energy for the first and the second external devices. The vehicle is capable of traversing the route without an external power supply. In some implementations, the requests from the first external device and the second external device include a request for an on-demand discharging of electrical energy from at least one of the first external device and/or the second external device. The ECU is further configured to utilize at least a portion of the electrical energy to be discharged from the at least one of the first external device and/or the second external device to power the vehicle, the portion of the electrical energy configured to be stored on the energy storage device of the vehicle and enable the vehicle to traverse the route without the external power supply. In some implementations, the ECU is further configured to receive a request for an on-demand charging or discharging of electrical energy for at least a third external device to be performed simultaneously as on-demand charging or discharging of electrical energy for at least one of the first external device and/or the second external device. In some embodiments, the vehicle further includes a network access device configured to communicate with a remote device providing one or more instructions related to the on-demand charging or discharging of electrical energy for the first and the second external devices; and the ECU is further configured to: receive, via the network access device and from the remote device, the one or more instructions related to the on-demand charging or discharging of electrical energy for the first and the second external devices, and receive, via the network access device, or determine information related to a charge rate or an initial hand-shake relating to at least one of (i) voltage confirmation, (ii) a current limit, and/or (iii) a charge start, stop, or pause. In some embodiments, the vehicle is a manually driven vehicle. In some embodiments, the vehicle is an autonomously driven vehicle.

Also described herein is a method for managing on-demand charging or discharging of electrical energy for a plurality of external devices. The method includes: receiving data related to a first request and a second request from, respectively, a first external device and a second external device each requesting an on-demand charging or discharging of electrical energy; determining, based on the received data, a first amount of electrical energy to be charged to or discharged from the first external device and a second amount of electrical energy to be charged to or discharged from the second external device; determining a state of charge (SOC) of an energy storage device of a vehicle; and determining, based on the first amount of electrical energy, the second amount of electrical energy, and the SOC of the energy storage device of the vehicle, whether the vehicle is capable of providing the on-demand charging or discharging of electrical energy for the first and the second external devices without requiring any additional electrical energy.

In some embodiments, the method further includes determining a route for providing the on-demand charging or discharging of electrical energy for the first and the second external devices such that the vehicle is capable of traversing the route without an external power supply. In some implementations, the requests from the first external device and the second external device include a request for an on-demand discharging of electrical energy from at least one of the first external device and/or the second external device; and the vehicle is configured to utilize at least a portion of the electrical energy to be discharged from the at least one of the first external device and/or the second external device to power the vehicle, the portion of the electrical energy configured to be stored on the energy storage device of the vehicle and enable the vehicle to traverse the route without the external power supply. In some implementations, the method further includes: receiving a request for an on-demand charging or discharging of electrical energy for at least a third external device to be performed simultaneously as on-demand charging or discharging of electrical energy for at least one of the first external device and/or the second external device; and providing the on-demand charging or discharging of electrical energy for the at least third external device simultaneously as the on-demand charging or discharging of electrical energy for the at least one of the first external device and/or the second external device. In some embodiments, the method further includes receiving, via a network access device, or determining information related to a charge rate or an initial hand-shake relating to at least one of (i) voltage confirmation, (ii) a current limit, and/or (iii) a charge start, stop, or pause; and the receiving the data related to the first request and the second request includes receiving, via the network access device and from a remote server or a user device, the data related to the first request and the second request. In some embodiments, the method further includes providing electrical energy discharged from at least one of the first external device and/or the second external device to an electric grid.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 4C is an illustration of an example scenario in which a vehicle including a system for management of on-demand charging or discharging of electrical energy may be utilized according to an embodiment of the present invention;

DETAILED DESCRIPTION

Figure 1:
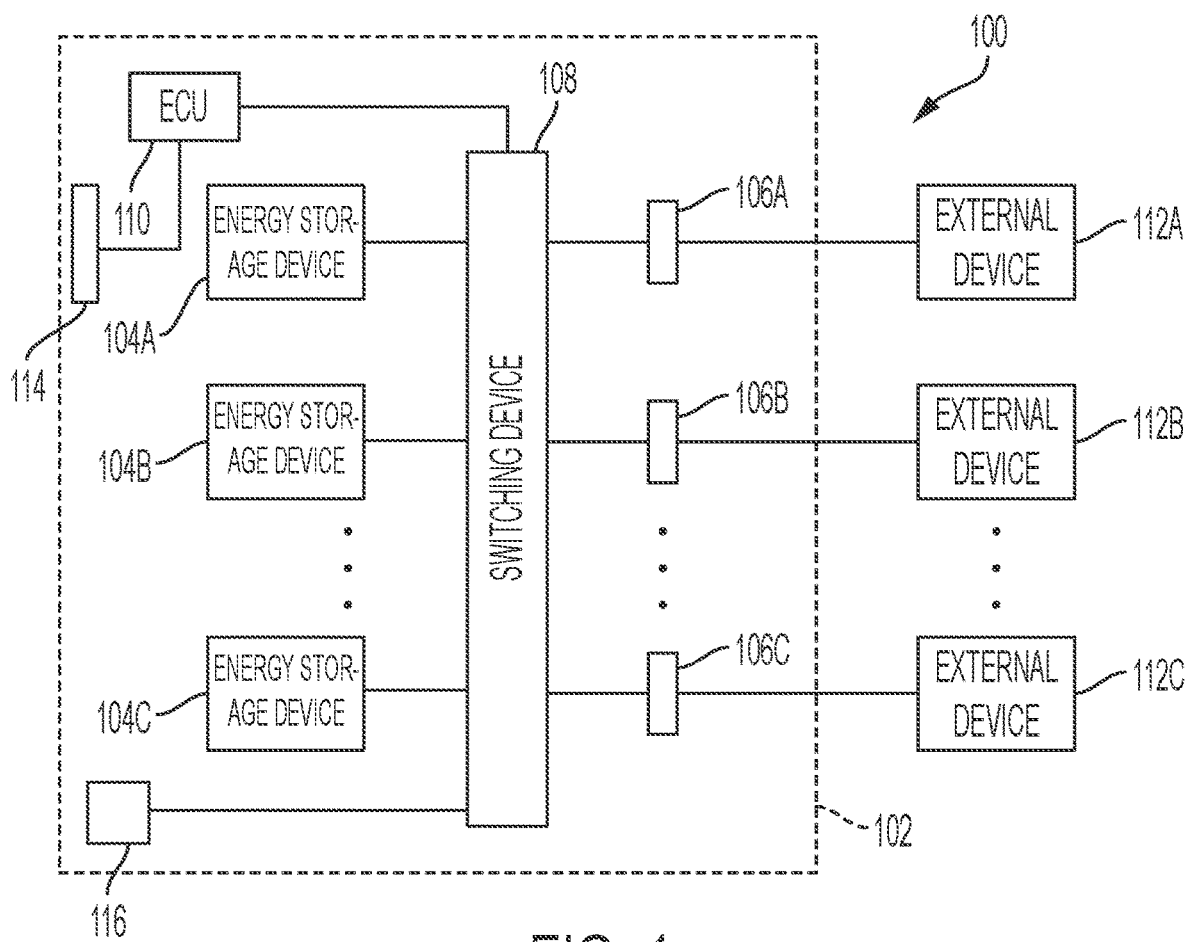
FIG. 1 is a block diagram of a system for management of on-demand charging or discharging of electrical energy according to an embodiment of the present invention.

The present disclosure describes systems, methods, and apparatus for management of on-demand charging or discharging of electrical energy. These systems, methods, and apparatus provide many benefits and advantages including, e.g., providing a mobile charging station for fuel-efficient vehicles (e.g., electric vehicles (EVs)) capable of taking charge from the fuel-efficient vehicles and supplying the charge back to an electric grid. Such a mobile charging station may be capable of coming to a user (e.g., on demand), taking charge from a fuel-efficient vehicle, and allowing for the user to receive monetary compensation and offload excess energy at any location.

An apparatus configured for the mobile charging or discharging service provided by various embodiments of the present disclosure may be any kind of autonomous or driven vehicle, robot, or other transportation device capable of coming to the user (or the user's vehicle) who makes an on-demand request to charge or discharge energy (e.g., to offload excess energy). The user may request the service by using a mobile device software program application or contacting a service provider directly. In some embodiments, the user may share a current state of charge (SOC) of his or her fuel-efficient vehicle (e.g., EV) when requesting the service so that the service provider may be prepared for how much energy is to be provided and/or taken in. When a service provider apparatus (e.g., vehicle, robot, or the like) arrives at the user's vehicle location and energy is received by the service provider apparatus, the user may be rewarded via monetary compensation, and the received excess energy may be provided (e.g., sold) to an electric grid.

In some embodiments, the system described herein includes a plurality of energy storage devices configured to store electrical energy, one or more connectors configured to connect with a plug of an external device, a switching device configured to control a connection between one or more of the plurality of energy storage devices and the one or more connectors, and an electronic control unit (ECU) coupled to the switching device. The ECU may be configured to receive data relating to a first external device and a second external device each requesting an on-demand charging or discharging of electrical energy. The ECU may also determine, based on the received data, a first amount of electrical energy to be charged to or discharged from the first external device and a second amount of electrical energy to be charged to or discharged from the second external device. The ECU may also determine whether a service provider apparatus is capable of providing the on-demand charging or discharging of electrical energy for the first and the second external devices without requiring any additional electrical energy.

Furthermore, in some embodiments, the system may determine a route for providing the on-demand charging or discharging of electrical energy for a plurality of external devices (e.g., the first external device and the second external device), which may be traversed by the service provider apparatus without an external power supply. For example, the service provider apparatus may utilize a portion of electrical energy to be discharged from at least one external device to enable the service provider apparatus (e.g., a mobile charging station or apparatus) to traverse the route without the external power supply.

Moreover, in some embodiments, the system may receive a request for an on-demand charging or discharging of electrical energy for a plurality of external devices including more than one external device to receive the on-demand charging or discharging service simultaneously.

Further, in some embodiments, the system may utilize a plurality of stackable energy storage devices (e.g., batteries) and provide many benefits and advantages such as efficiently receiving, storing, and/or delivering the electrical energy in a user-configurable and versatile manner. The efficient receiving, storing, and/or delivering of the electrical energy includes receiving and/or delivering the electrical energy from and/or to more than one vehicle simultaneously.

These features are advantageous because the plurality of stackable energy storage devices (also may be referred to as batteries throughout the detailed description) provide a way to add or remove one or more battery packs as needed for the on-demand charging or discharging of electrical energy described herein, allowing advantageously the service provider apparatus to be well prepared to service the external devices efficiently (e.g., without having to traverse a same pathway repeatedly to "refill" energy when providing the on-demand charging or discharging of electrical energy service). For example, the service provider apparatus may minimize traveling (e.g., to save energy consumed for the traveling) by having an intelligently planned optimized route for servicing the external devices which may otherwise (i.e., without the plurality of stackable energy storage devices) require the service provider apparatus to continuously traverse back to, e.g., a hub of energy source to refill or offload electrical energy as needed to service the external devices. In some examples, the service provider apparatus may utilize a portion of collected excess energy (e.g., by collecting charge or an unused battery pack from an external device) to power itself to travel a greater distance than a predetermined maximum range (e.g., based on a capacity of a native energy storage device of the service provider apparatus). The foregoing benefit may be achieved by having the intelligently planned optimized route including stop(s) for collecting the excess energy (e.g., including unused battery pack(s)) from one or more external devices, which may be utilized to give additional charge/energy to power the service provider apparatus to travel further.

Additional benefits and/or advantages include: (1) battery mass carried on a route may be minimized with intelligent route optimization (which also improves fuel/energy efficiency on the route as well as operating cost); (2) the battery mass carried on the route may be further optimized/minimized with incorporation of modular/stackable batteries in a customer sale or lease model; (3) the modular/stackable batteries may be small enough to be manually manipulated (i.e., by hand) in areas difficult to access by vehicle; and (4) the batteries may connect to existing devices such as wireless charging units (e.g., in a parking space with wireless capabilities) for a "no-touch" charging/discharging customer experience.

Turning to FIG. 1, a system 100 for management of on-demand charging or discharging of electrical energy is disclosed. The system 100 includes a mobile charging apparatus 102, a single unit or a plurality of energy storage devices 104A-C, one or more connectors 106A-C, a switching device 108, an electronic controller unit (ECU) 110, one or a plurality of external devices 112A-C, a user interface 114, and an outlet 116. The mobile charging apparatus 102 may also be referred to as a mobile charger.

As shown, the mobile charging apparatus 102 may include the plurality of energy storage devices 104A-C, the one or more connectors 106A-C, the switching device 108, the ECU 110, the user interface 114, and the outlet 116. In some embodiments, the mobile charging apparatus 102 may be (or be a part of) an autonomous and/or manually driven vehicle. For example, the mobile charging apparatus 102 may be built to be mobile by, e.g., having a set of wheels or other means (not shown) for moving the mobile charging apparatus 102 as well as, e.g., a motor and/or an engine (not shown) for propelling the mobile charging apparatus 102 to move from one location to another.

In some embodiments, the user interface 114 may be utilized for setting the mobile charging apparatus 102 to be in an autonomous mode, a semi-autonomous mode (e.g., an autonomous mode with some user input utilized for some functionalities), or a manual mode. For example, the user interface 114 may include an infotainment system of a vehicle configured to receive user input for setting the autonomous mode, the semi-autonomous mode, or the manual mode. Moreover, in some embodiments, the user interface 114 may include a display (e.g., a touch screen) which may be utilized to show monetary transaction related to, e.g., the mobile charging apparatus 102 receiving or giving charge. For example, a user may be compensated for offloading excess energy from his or her vehicle (e.g., on demand) by, e.g., sending a request via a mobile device software application program (or contacting a service provider directly) to call for the mobile charging apparatus 102 to a location so that the excess energy can be provided from his or her vehicle to the mobile charging apparatus 102 on demand. Furthermore, in some embodiments, the outlet 116 may be utilized by the mobile charging apparatus 102 to be connected to an electric grid so that the excess energy received from the user's vehicle may be provided back to the electric grid (i.e., establishing a vehicle-to-grid (V2G) service). Moreover, in various embodiments, the outlet 116 may be utilized for connecting to any number of additional external devices (e.g., in addition to the electric grid) such as for powering homes or businesses in emergency grid-down conditions or providing supplemental power to stationary battery systems that support business and/or grid needs. In some embodiments, the outlet 116 may include any number of DC and/or AC outlets to power any number of other devices in addition to vehicles (i.e., similar to a power station).

With reference to the plurality of energy storage devices 104A-C, while only three (3) energy storage devices (104A, 104B, and 104C) are shown, it would be apparent to one of ordinary skill in the art that the number of the energy storage devices 104A-C may vary. The energy storage devices 104A-C may be batteries of any type including for example a lithium-ion battery and contain individual battery units, each of which can be individually and independently charged and/or discharged. Moreover, the energy storage devices 104A-C may be grouped (logically or physically) into one or more groups of energy storage devices 104A-C. In various embodiments, the energy storage devices 104A-C may be connected in series, parallel, or a combination including both serial and parallel connections (e.g., in order to meet the voltage and/or capacity requirements of the external device(s)). In some embodiments, one or more of the energy storage devices 104A-C may be connected via a single power circuit to the switching device 108. In some embodiments, each battery or battery unit of the energy storage devices 104A-C may be connected to a single external device 112A, 112B, or 112C. In other embodiments, each group of the energy storage devices 104A-C (each group including one or more of the energy storage devices 104A-C, for example) may be connected to a single external device 112A, 112B, or 112C. In further embodiments, each battery or battery unit (or each group of the energy storage devices 104A-C) may be connected to more than one of the external devices 112A-C. A given group of energy storage devices 104A-C may charge and/or discharge energy at a same rate, and in some embodiments, more than one grouping with more than one converter/inverter may be implemented. In some embodiments, the group of the energy storage devices 104A-C may have a single connection to the switching device 108. In various embodiments, the energy storage devices 104A-C may include built-in converter/inverters or connect to one or more separate converter/inverters.

In some embodiments, the energy storage devices 104A-C may be stackable and removable from the mobile charging apparatus 102 and may be housed in corresponding receptacles (not shown) within the mobile charging apparatus 102 to which the energy storage devices 104A-C can be connected. As but one example, the energy storage devices 104A-C may be clicked into the receptacles within the mobile charging apparatus 102 (i.e., under tension). In some embodiments, the receptacles and/or the mobile charging apparatus 102 may include necessary ports, wiring, and/or connections for enabling the connections between the energy storage devices 104A-C and the external devices 112A-C, such that the energy storage devices 104A-C and/or the receptacles may be easily removable from the mobile charging apparatus 102 without interrupting any functionality of the mobile charging apparatus 102 or any complicated disconnection and/or re-wiring of the remaining energy storage devices. Thus, the energy storage devices 104A-C may be added to or removed from the mobile charging apparatus 102 as needed (e.g., additional energy storage devices may be added to the mobile charging apparatus 102 to increase available capacity and/or power of the mobile charging apparatus 102).

Accordingly, not only may the mobile charging apparatus 102 provide an on-demand charging and/or discharging service, but the mobile charging apparatus 102 may also collect and/or provide individual units of the energy storage devices 104A-C on demand. For example, the removability and transportability of the energy storage devices 104A-C may allow one or more of the energy storage devices 104A-C to be repurposed or refurbished as, e.g., a mobile range extender, a home back-up battery, or a mobile power station (e.g., on demand). Moreover, one or more of the energy storage devices 104A-C removed from the mobile charging apparatus 102 could be used to connect (e.g., directly) to an electric vehicle (e.g., supplying a low voltage/current energy to a main battery of the vehicle while the vehicle is being driven). In various embodiments, the connection could be of a DC-DC boost converter or an AC to onboard charger (inverter). As a brief aside, different levels of SOC for the batteries may be balanced before the batteries are connected in serial or parallel. Furthermore, any unused (e.g., fully or partially) energy storage device may be collected from a user's vehicle and added to the mobile charging apparatus 102 on demand.

In some embodiments, the energy storage devices 104A-C may be ergonomically sized (e.g., with respect to handle width, handle grip, etc. and including a movement assistance with rollers) such that the energy storage devices 104A-C may be easily removable and/or transportable, thus allowing the energy storage devices 104A-C to be easily repurposed and/or exchanged between the mobile charging apparatus 102 and a user. In some embodiments, the energy storage devices 104A-C removed from the mobile charging apparatus 102 may be stored in a front trunk ("frunk"), a truck bed or deck, a trailer, and/or the like of an electric vehicle to function as a range extender, and any unused energy storage device from the electric vehicle may be collected from the frunk, the truck bed or deck, the trailer, and/or the like. The energy storage devices 104A-C (and the corresponding receptacle(s) in some examples) may be stackable within the electric vehicle when functioning as a range extender. In some embodiments, an integrated CPU (central processing unit) and/or a solar controller may be utilized, e.g., by the electric vehicle (or a power controller at, e.g., a home or business site incorporating the energy storage devices 104A-C removed from the mobile charging apparatus 102) to enable, e.g., uninterruptible power supply (UPS) or transfer/switching among an electric grid line, solar or other renewable energy source, and/or the energy storage devices 104A-C, including a direct AC input/output connection to a home circuit breaker panel.

As shown in FIG. 1, the energy storage devices 104A-C may be connected to the external devices 112A-C via the connectors 106A-C. In various embodiments, the energy storage devices 104A-C may be connected in series or parallel. The connectors 106A-C may be any type of connectors known in the art to provide a connection between the energy storage devices 104A-C and the external devices 112A-C. The external devices 112A-C may be connected to the energy storage devices 104A-C (e.g., for receiving and/or providing electrical energy) via the connectors 106A-C and corresponding plugs of cables or wires extending from the external devices 112A-C plugged into the connectors 106A-C. Thus, in some embodiments, more than one of the external devices 112A-C may be serviced by the mobile charging apparatus 102 simultaneously (for, e.g., receiving and/or providing electrical energy). Moreover, while not shown, the mobile charging apparatus 102 may include other types of device interfaces for input and/or output—such as for example AC (alternating current) outlets and USB (universal serial bus) outlets as well as DC (direct current) input (e.g., from a solar or fuel cell energy source), AC input, etc.

The switching device 108 may be configured to open and/or close one or more connections between the energy storage devices 104A-C and the connectors 106A-C, thus enabling and/or disabling one or more connections between the energy storage devices 104A-C and the external devices 112A-C (and/or any electric grid with the outlet 116 in a similar manner). In some embodiments, the switching device 108 may include a plurality of switches (e.g., of any type known in the art; an example of the switching device 108 including a BMS (Battery Management System)) which may be controlled (individually and/or in group) to provide the connections between the energy storage devices 104A-C and the connectors 106A-C (and thus the external devices 112A-C). Moreover, in some embodiments, the switching device 108 may include a converter (DC to DC) or an inverter (DC to AC)—depending on customer needs. The converter/inverter may be controlled by a controller (e.g., the ECU 110) to switch modes as needed. Furthermore, in various embodiments, the ECU 110 described herein may be integrated into or separate from the converter or the inverter.

The ECU 110 may be connected or coupled to the switching device 108 to control the switching device 108 as described herein. Depending on needs of individual external devices 112A-C (e.g., fuel-efficient vehicles) plugged into the mobile charging apparatus 102 and connected to the energy storage devices 104A-C, a single battery (e.g., the energy storage device 104A) or more than one battery (e.g., any combination of the energy storage devices 104A, 104B, and/or 104C) may be utilized to provide electrical energy to or receive electrical energy from a battery of, e.g., an external device 112A. For example, if the connected external device such as a fuel-efficient vehicle (e.g., the external device 112A) demands an amount of energy larger than a threshold amount or a rate of charge or discharge (e.g., based on voltage and/or current) higher than a threshold rate, more than one of the energy storage devices 104A-C may be used at once to charge (and/or receive electrical energy from) an energy storage device (not shown) of the external device 112A (e.g., a semi-truck or the like). Furthermore, for a higher load capacity than a threshold load capacity, more than one of the energy storage devices 104A-C may be used at once to charge or discharge the external device 112A (i.e., an energy storage device thereof). As discussed herein, such configurability allows for a more efficient way to provide electrical energy to and/or receive electrical energy from the external devices 112A-C.

Additionally, the ECU 110 may control one or more components of the mobile charging apparatus 102 (e.g., the switching device 108) such that the energy storage devices 104A-C may, e.g., take charge from the external devices 112A-C. For example, if one or more of the external devices 112A-C have excess energy and a user wants to give back energy (e.g., of a user-configurable amount) to an electric grid, the energy storage devices 104A-C may receive charge from the external devices 112A-C, and the retrieved energy may be relayed to the electric grid (e.g., via the outlet 116). In some embodiments, the user may receive monetary compensation in exchange, as described further herein. The reconfigurable stack of the energy storage devices 104A-C disclosed herein may be used to accommodate a wide variety of charging/discharging needs by linking, combining, or separating power sources within the stack of the energy storage devices 104A-C and/or among two or more of such battery stacks.

In some embodiments, the ECU 110 may be included in the system 100 and include or couple to one or more processors. These one or more processors (i.e., the ECU 110 and/or any other ECU described herein) may be implemented as a single processor or as multiple processors. For example, the ECU 110 may be a microprocessor, a data processor, a microcontroller, or other controller, and may be electrically coupled to some or all of the other components within the mobile charging apparatus 102.

As discussed herein, the external devices 112A-C may each be any type of device including an energy storage device (e.g., a battery) which may receive or provide electrical energy from or to the energy storage devices 104A-C (thus allowing bi-directional charging). In some embodiments, the external devices 112A-C may be fuel-efficient vehicles.

Figure 2:
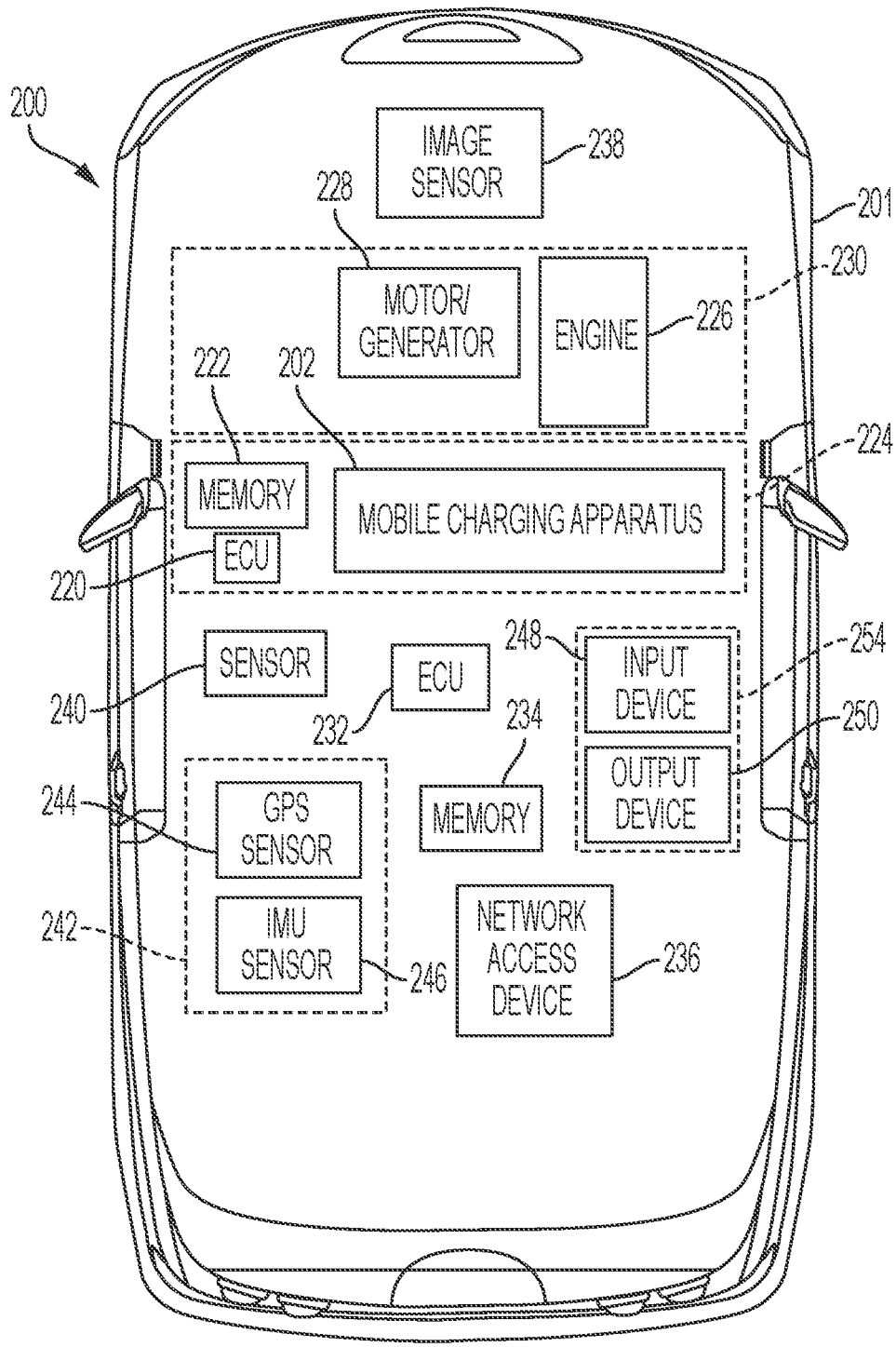
FIG. 2 is a block diagram of a vehicle including a system for management of on-demand charging or discharging of electrical energy according to an embodiment of the present invention.

FIG. 2 is a block diagram of a vehicle 200 (e.g., being or including the mobile charging apparatus 102) including a system 224 for management of on-demand charging or discharging of electrical energy. The vehicle 200 may include the system 224 including a mobile charging apparatus 202 (e.g., similar to at least portions of the mobile charging apparatus 102), a system ECU 220, and a system memory 222. Moreover, the vehicle 200 may include a vehicle ECU 232, a vehicle memory 234, a torque source 230 (including a motor-generator 228 and/or an engine 226), a network access device 236, an image sensor 238, a sensor 240, a location sensor 242 (including a GPS (global positioning system) sensor 244 and/or an inertial measurement unit (IMU) sensor 246), and a user interface 254 (including an input device 248 and/or an output device 250) within or on a main body 201. While not shown, the vehicle 200 may also include one or more junction boxes configured to house electrical connections of the various components of the vehicle 200 described herein.

In some embodiments, the main body 201 may be propelled along a roadway. The main body 201 may resemble a vehicle such as a car, a bus, a tugger or tow tractor, a sports utility vehicle, a truck, or the like and support one or more individuals such as a driver, a passenger, or the like. Furthermore, the main body 201 may define or include a vehicle cabin (not shown) in which the driver, the passenger, or the like may be located.

The vehicle ECU 232 may be coupled to each of various components of the vehicle 200 and may include one or more processors or controllers which may be specifically designed and programmed for, e.g., automotive systems. The functions of the vehicle ECU 232 may be implemented in a single ECU or in multiple ECUs. For example, the vehicle ECU 232 may include a torque ECU (not shown) that controls the torque source 230, a user interface ECU (not shown) that controls the user interface 254, or the like. Moreover, the vehicle ECU 232 may include an electrical supply unit (ESU) configured to, e.g., perform control of various components of the vehicle 200 (e.g., headlight, map light, door lock actuator, etc.). The vehicle ECU 232 may receive data from one or more of the components of the vehicle 200, may make determinations based on the received data, and may control the operations of the one or more of the components based on the determinations. For example, the vehicle ECU 232 may receive a request to control one or more components (e.g., the torque source 230, or the like) to be actuated to cause the vehicle 200 to traverse from one location to another. The request may be based on a user input (e.g., a driver) or one or more types of data captured by, e.g., the image sensor 238, the location sensor 242, etc. when the vehicle 200 is being driven, respectively, manually or autonomously. The request may also include, e.g., an input from a brake pedal (not shown) which may be utilized for determining a brake operation based on the received brake request causing one or more components of a brake system (not shown) to be actuated so as to, e.g., slow down or stop movement of the vehicle 200. It would be apparent to one of ordinary skill in the art that other functionalities (e.g., automotive functionalities such as steering) may be achieved in a similar manner. The vehicle ECU 232 may include or cooperate with the system ECU 220 (e.g., the ECU 110) to determine one or more actions (e.g., related to the switching device 108) to be performed by one or more components of the vehicle 200 so as to enable the on-demand charging and/or discharging of electrical energy described herein.

The vehicle 200 may be non-autonomous, fully autonomous, or semi-autonomous. In that regard, the vehicle ECU 232 may control various aspects of the vehicle 200 (such as steering, braking, accelerating, or the like) to maneuver the vehicle 200 from a starting location to a destination location. In some embodiments, the vehicle 200 may be operated in an autonomous, semi-autonomous, or fully driver-operated state. In that regard, the vehicle 200 may be operated independently of driver control and, from time to time, without a person inside of the vehicle 200. The vehicle ECU 232 may facilitate the autonomous functionality.

The system ECU 220 may be or include the ECU 110 discussed with reference to FIG. 1 and be coupled to one or more components of the system 224 (e.g., the system 100) for management of on-demand charging or discharging of electrical energy. The system ECU 220 may include one or more processors or controllers which may be specifically designed and programmed for the system 224. The functions of the system ECU 220 (e.g., a dedicated ECU for the system 224 (i.e., for management of on-demand charging or discharging of electrical energy)) may be implemented in a single ECU or in multiple ECUs. The system ECU 220 may monitor and/or control the system 224 to at least one of actuate one or more components (e.g., of the system 100 with reference to FIG. 1) or monitor status of the on-demand charging or discharging of electrical energy. Furthermore, the vehicle ECU 232 and/or the system ECU 220 may control the user interface 254 (e.g., the output device 250) to display information related to the monitored status of the on-demand charging or discharging of electrical energy. In some embodiments, the system ECU 220 may cooperate with the vehicle ECU 232 or solely operate to control the system 224.

The vehicle memory 234 may include any non-transitory memory and may store data usable by the vehicle ECU 232. The vehicle memory 234 may be located within or on the main body 201 and may be referred to as a local memory. In some embodiments, the vehicle memory 234 may be located remote from the main body 201 and may be referred to as a remote memory.

In some embodiments, the system ECU 220 may include the system memory 222 (e.g., a non-transitory memory) that may be same as or separate from the vehicle memory 234. The system memory 222 may store data usable by the system ECU 220 to monitor and/or control operations of the system 224 for management of the on-demand charging or discharging of electrical energy.

The torque source 230 may include one or more of an engine 226 or a motor-generator 228. As referenced herein, the vehicle ECU 232 may monitor and/or control operation of the torque source 230 (including the engine 226 and/or the motor-generator 228), and the vehicle ECU 232 and/or the system ECU 220 may monitor and/or control operation of the system 224 for management of the on-demand charging or discharging of electrical energy. The system 224 may include the mobile charging apparatus 202 which is described in more detail throughout the present disclosure. In some embodiments, the vehicle 200 may itself be and function as the mobile charging apparatus 202. In other embodiments, the vehicle 200 may include the mobile charging apparatus 202 within the main body 201 (e.g., installed or integrated therein) or tow the mobile charging apparatus 202 in a trailer (not shown), for example.

The engine 226 may convert a fuel into mechanical power for propelling the vehicle 200. In that regard, the engine 226 may be a gasoline engine, a diesel engine, an ethanol engine, or the like. Optionally, the vehicle 200 may not include the engine 226 and may be an electric vehicle with the motor-generator 228.

The motor-generator 228 may convert, e.g., electrical energy stored in an energy storage device (not shown; the energy storage device may store the electrical energy and include one or more energy storage devices including a battery, a flywheel, a super capacitor, a thermal storage device, or the like) or received directly from, e.g., a fuel-cell circuit (not shown; the fuel-cell circuit may include a plurality of fuel cells (e.g., one or more fuel cell stacks) that facilitate a chemical reaction to generate electrical energy along with a system or systems for providing hydrogen and oxygen (or any other compounds)) into mechanical power usable to propel the vehicle 200. The motor-generator 228 may further convert mechanical power received from the engine 226 or from wheels of the vehicle 200 into electricity, which may be stored in the energy storage device (not shown) as energy and/or used by other components of the vehicle 200. In some embodiments, the motor-generator 228 may include a motor without a generator portion, and, in some embodiments, a separate generator may be provided.

As described further herein (e.g., with reference to FIG. 1), the system 224 and/or the mobile charging apparatus 202 may include a plurality of energy storage devices (e.g., the energy storage devices 104A-C), one or more connectors (e.g., the connectors 106A-C), a switching device (e.g., the switching device 108), an ECU (e.g., the ECU 110), a user interface (e.g., the user interface 114), and an outlet (e.g., the outlet 116), as well as the system ECU 220 and the system memory 222. Moreover, the system 224 and/or the mobile charging apparatus 202 may also include an On-Board Charger (OBC) configured to, e.g., convert AC power from an external charging source into a DC voltage that is used to charge the battery pack (e.g., the energy storage devices 104A-C) in the vehicle 200.

The location sensor 242 may include any sensor capable of detecting data corresponding to a location of the vehicle 200. For example, the location sensor 242 may include one or more of a global positioning system (GPS) sensor 244, an inertial measurement unit (IMU) sensor 246, and/or the like. The GPS sensor 244 may detect data corresponding to a location of the vehicle 200. For example, the GPS sensor 244 may detect global positioning coordinates of the vehicle 200 (e.g., based on communications with a plurality of GPS satellites, etc.). The IMU sensor 246 may include one or more of an accelerometer, a gyroscope, or the like. The IMU sensor 246 may detect inertial measurement data corresponding to a position, a velocity, an orientation, an acceleration, or the like of the vehicle 200. The inertial measurement data may be used to identify a change in location of the vehicle 200, which the vehicle ECU 232 may track in order to determine the location of the vehicle 200.

The image sensor 238 may be connected to the main body 201 and may detect image data corresponding to an environment of the vehicle 200, data corresponding to a vehicle cabin (not shown), and/or the like. For example, the image sensor 238 may include a camera, a RADAR detector, a LIDAR detector, or any other image sensor capable of detecting light having any wavelength. The image sensor 238 may include one or multiple image sensors which may be oriented to detect image data in any direction relative to the main body 201 (and/or within the vehicle cabin). For example, the image sensor 238 may include four or more RADAR detectors to detect RADAR data on four or more sides of the main body 201. The image sensor 238 may also or instead include a first camera to detect image data in a forward direction relative to the main body 201 and a second camera to detect image data in a rear direction relative to the main body 201.

The sensor 240 may include one or more sensors capable of detecting a status of a vehicle component. For example, the sensor 240 may include a voltage sensor, a current sensor, a power sensor, an SOC sensor, and/or the like. In one example, the sensor 240 may detect data related to an SOC of the vehicle 200 which may be utilized by, e.g., the vehicle ECU 232 to make various determinations related to, e.g., an intelligently planned optimized route to provide the on-demand electrical energy charging or discharging service described in more detail throughout the present disclosure. For example, the sensor 240 may be utilized to detect the data related to the SOC in any method known in the art including, e.g., a chemical method (related to specific gravity or pH of liquid electrolyte of a battery), a voltage method (related to a battery voltage), a current integration method ("Coulomb counting"), combined approaches (related to the voltage method and the current integration method), Kalman filtering, and a pressure method (related to an internal pressure of a battery).

The input device 248 may include one or more input devices such as a button, a keyboard, a mouse, a touchscreen, a microphone, or the like. The input device 248 may receive input from a user of the vehicle 200 such as a driver or a passenger. The input device 248 may receive, for example, information corresponding to a request for cruise control, information usable to control an auxiliary component of the vehicle 200 (e.g., to control a navigation device or a stereo), or the like. In some embodiments, the input device 248 may include additional input device(s) usable to control the vehicle 200 such as an accelerator pedal, a brake pedal, a steering wheel, or the like. The input device 248 may also or instead receive information corresponding to a request for the vehicle 200 to drive autonomously.

Moreover, the input device 248 may receive input from a user (a driver or a passenger of a fuel-efficient vehicle including a battery to be charged or to discharge energy) of an external device (e.g., 112A, 112B, or 112C of FIG. 1). The input device 248 may receive, for example, information corresponding to a request for charging or drawing charge from an energy storage device such as a battery of an external device. The request may include information such as a rate of charge/discharge (e.g., related to how fast to charge or discharge from the battery of the external device) and/or an amount of charge/discharge (e.g., 10%, 20%, 30%, 40%, 50%, 60%, 70%, 80%, 90%, 100%, etc. of the energy storage capacity) for the energy storage device of the external device. Further, the request may include information related to scheduling of the on-demand charging or discharging at a future date and/or time. The request may also include information related to a brand/maker of the vehicle to receive the on-demand charging or discharging, wherein the brand/maker may be a preferred brand/maker allowing the vehicle to receive prioritized scheduling and/or discounted price(s) for the on-demand service(s). Moreover, the request may include information related to purchasing or renting one or more batteries (e.g., the energy storage devices 104A-C of the mobile charging apparatus 102), which may be utilized for various purposes such as, e.g., extending a driving range of a vehicle, emergency roadside assistance, emergency back-up power, power supply to an off-grid load, etc. as described herein. Further, the request may also include information related to returning one or more batteries to be put back into the mobile charging apparatus 202. Additionally, the input device 248 may accept various monetary payment methods as known in the art to receive payment for charging a battery, e.g., at a rate or by an amount higher than, respectively, a threshold rate or a threshold amount or purchasing or renting a battery pack.

In some embodiments, an option to select the rate or amount of charge/discharge or the purchase, rent, or return of an energy storage device may be limited based on a minimum or maximum number (e.g., one or ten) of energy storage devices available in the mobile charging apparatus 202. When only the minimum number (or lower) of energy storage devices is available within the mobile charging apparatus 202, the input device 248 may not provide or may disable or block the option to select the rate or amount of charge/discharge or the purchase or rent the energy storage device until more than the minimum number of energy storage devices becomes available. Moreover, when the maximum number (or higher) of energy storage devices is present in the mobile charging apparatus 202, the input device 248 may not provide or may disable or block the option to return any energy storage device.

The output device 250 may include any output device such as a speaker, a display, a touchscreen, or the like. The output device 250 may output data to a user of the vehicle 200. The output device 250 may, for example, output information corresponding to autonomous control of the vehicle 200, information relating to the SOC, a status/route/map of the on-demand electrical energy charging/discharging service, and/or the like. Moreover, the output device 250 may output information corresponding to a menu for selecting the rate or amount of charge/discharge or purchasing, renting, or returning an energy storage device discussed herein with reference to the input device 248. In some embodiments, the output device 250 may provide information related to an amount of monetary compensation corresponding to an amount of energy discharged from the external devices into the one or more batteries included in the mobile charging apparatus 202.

In some embodiments, the user interface 254 may be a user interface device attached to or integrated with the mobile charging apparatus 202. In some embodiments, the user interface 254 may be a user interface available on a remote device such as, e.g., a smartphone, a tablet, or the like which may be connected to the mobile charging apparatus 202 via wire or wirelessly. For example, the mobile charging apparatus 202 may further include a transceiver (not shown) which may be utilized to establish a wireless connection between the mobile charging apparatus 202 and the remote device including the user interface 254. The wireless connection may be provided by any type of wireless connection known in the art such as for example Bluetooth, Wi-Fi, etc.

The network access device 236 may include any network access device capable of communicating via a communications protocol (e.g., a wireless protocol). For example, the network access device 236 may include a transceiver and communicate via Bluetooth, Wi-Fi, a cellular protocol, vehicle-to-vehicle (V2V) communications, Zigbee, or any other communications (e.g., wireless) protocol. The network access device 236 may be referred to as a data communication module (DCM) and may communicate with any device on the vehicle 200 and/or any remote device.

In some embodiments, the vehicle 200 may receive, via the network access device 236, SOC information of various external devices (e.g., the external devices 112A-C) requesting the on-demand charging or discharging of electrical energy. The SOC information as well as other charging related information including, e.g., charge rates and initial hand-shakes such as voltage confirmation, current limits, and charge start/stop/pause may be communicated or received via a physical connection (e.g., CAN (Controller Area Network)) or a wireless connection (e.g., Wi-Fi) from a remote server receiving the requests from the external devices and/or a remote user device (e.g., a smartphone, a tablet, or the like which may be used to run a software program application to share the SOC information with the vehicle 200). Moreover, the SOC information may be received directly from a device or a vehicle which needs the on-demand electrical energy charging/discharging service (e.g., via V2V technology). The SOC status of the vehicle 200 as well as the SOC status of the external device(s) may be utilized to determine, e.g., whether the vehicle 200 can go directly to a user device (e.g., the external device 112A, 112B, or 112C) or whether the vehicle 200 needs to make any stop before going to the user device (e.g., to draw charge from or offload charge to another external device, to take charge or battery and/or battery packs from, e.g., a centralized hub of energy source, etc. Such information can be utilized by the mobile charging apparatus 202 and/or the vehicle 200 to determine or plan a route that would optimize the travel and/or distribution of the on-demand electrical energy charging/discharging service (e.g., for a threshold distance or less traveled, a threshold usage of energy or less by the mobile charging apparatus 202, etc.). In some embodiments, such a planned optimized route may be displayed by the output device 250 for a driver of the vehicle 200 to see and follow to manually drive the vehicle 200 to its destination(s) indicated by the route or utilized by the vehicle 200 to autonomously travel to its destination(s). In some embodiments, artificial intelligence/machine learning algorithms such as Reinforcement Learning (RL) algorithms or Q-Learning or model free algorithms may be utilized for the determination of the intelligently planned optimized route. Moreover, in some embodiments, such a planned optimized route may allow the vehicle 200 to continue to travel without having to "refill" energy or requiring an external power supply, etc., by making sure to schedule stop(s) for drawing excess energy from the external device(s) which may be used to charge an energy storage device of the vehicle 200.

Figure 3:
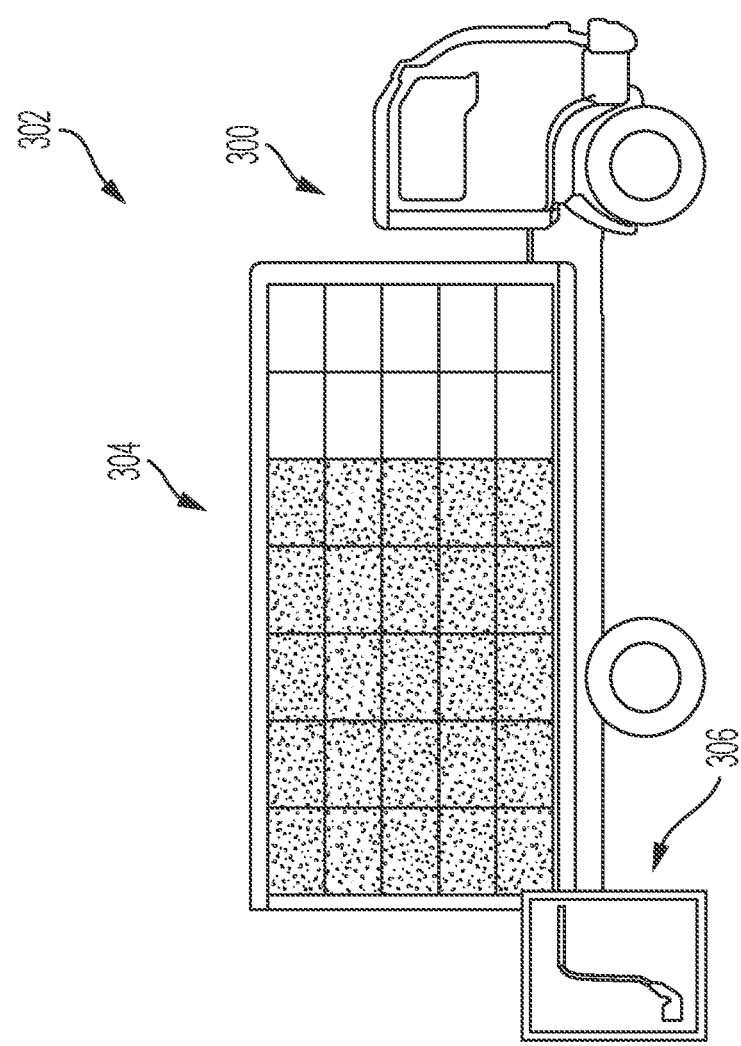
FIG. 3 is an illustration of an example vehicle or apparatus having a system for management of on-demand charging or discharging of electrical energy according to an embodiment of the present invention.

Turning to FIG. 3, a mobile charging apparatus 302 is shown. The mobile charging apparatus 302 includes a vehicle 300 (e.g., truck), a plurality of energy storage devices 304, and a cable 306. As shown, the vehicle 300 may carry the plurality of energy storage devices 304 to a location of a vehicle and provide the on-demand charging or discharging of electrical energy to the vehicle as described herein, e.g., via the cable 306 used to connect the vehicle which may receive the on-demand electrical energy charging or discharging service to the plurality of energy storage devices 304. As described herein with reference to, e.g., FIG. 1, the cable 306 may connect to one of one or more connectors (e.g., the one or more connectors 106) and at least a portion of the energy storage devices 304 (e.g., the shaded portion) to provide the on-demand charging or discharging of electrical energy to the vehicle as described herein.

Additional examples of the mobile charging system or apparatus (e.g., the mobile charging apparatus 302) may include the following. In some embodiments, the mobile charging system may include a vehicle (e.g., a truck) including a mobile charging apparatus and system included or integrated within the vehicle and providing the on-demand charging or discharging of electrical energy to a vehicle as described herein. In some embodiments, the mobile charging apparatus may be moved by another vehicle to a location of a vehicle to provide the on-demand charging or discharging of electrical energy to the vehicle as described herein. In some embodiments, the mobile charging apparatus may be included within a trailer of a vehicle (e.g., truck) and towed to a location of a vehicle to provide the on-demand charging or discharging of electrical energy to a vehicle as described herein. In some embodiments, the mobile charging apparatus may include a robot which may autonomously move to a location of a vehicle to provide the on-demand charging or discharging of electrical energy to the vehicle as described herein.

Figure 4A:
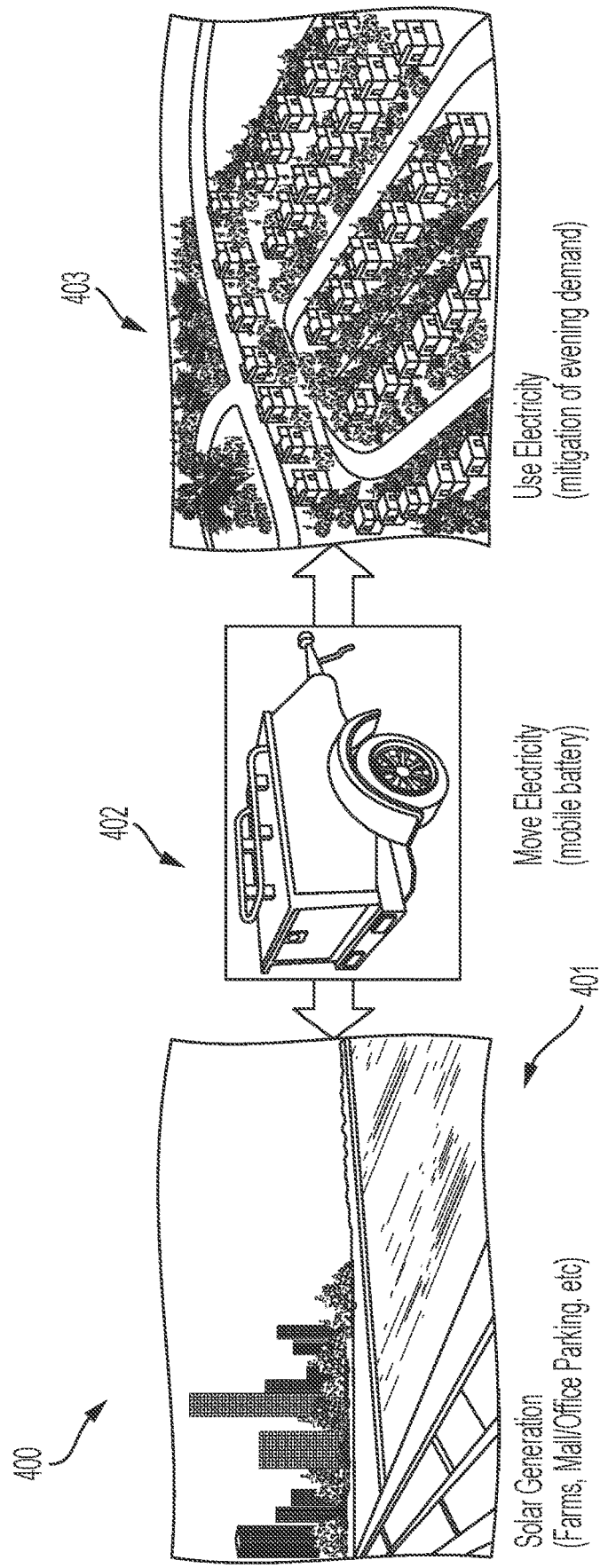
FIG. 4A is an illustration of an example scenario in which a vehicle including a system for management of on-demand charging or discharging of electrical energy may be utilized according to an embodiment of the present invention.

FIG. 4A is an illustration of an example scenario 400 in which a vehicle including a system for management of on-demand charging or discharging of electrical energy may be utilized. As shown, a device or a vehicle (not shown) which may be charged with electrical energy via, e.g., solar energy source 401 (e.g., connected to a farm, a mall/office parking lot, a home or business site, or the like) may carry more than enough energy for performing its intended functions. Then, a mobile charging apparatus 402 may be utilized to gather the excess energy from the device or the vehicle as needed by providing the on-demand discharging service of electrical energy as described herein. The mobile charging apparatus 402 may then connect to an electric grid servicing an area (403) to allow the excess energy from the device or the vehicle to be utilized by the electric grid to service, e.g., residential customers which may have a higher demand of energy than an amount of energy available from a renewable energy source (e.g., a solar energy source) at a given time of day.

Figure 4B:
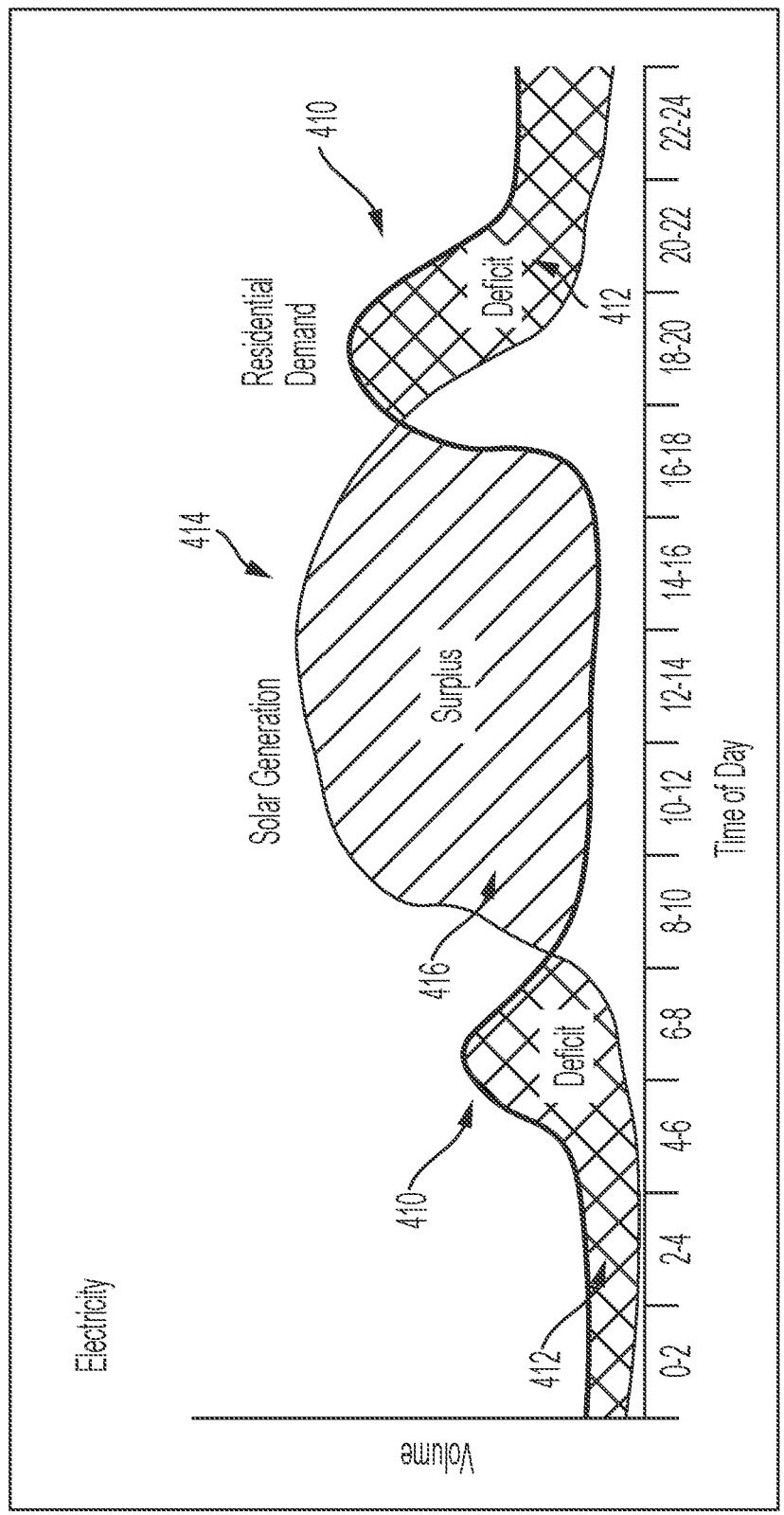
FIG. 4B is a graph illustrating an example scenario in which a vehicle including a system for management of on-demand charging or discharging of electrical energy may be utilized according to an embodiment of the present invention.

FIG. 4B is a graph illustrating an example scenario related to the discussion regarding FIG. 4A. As shown, line 410 indicates a volume of energy demand (e.g., of a residential home) at any given time of day. Line 414 indicates a volume of energy generated from a renewable energy source (e.g., a solar panel, etc.). A shaded area 412 below the line 410 and above the line 414 indicates an amount of energy deficit (i.e., based on demand compared against availability). A shaded area 416 below the line 414 and above the line 410 indicates an amount of energy surplus (i.e., based on demand compared against availability). As shown, there is an energy deficit during morning and night hours of day, while there is an energy surplus during daytime hours of day. Thus, a mobile charging apparatus (e.g., the mobile charging apparatus 402) may gather the excess energy from various devices and vehicles during the daytime, and offload the gathered excess energy back to an electric grid to provide the gathered excess energy back to, e.g., a residential customer when there is an energy deficit.

FIG. 4C is an illustration of an example scenario in which a vehicle including a system for management of on-demand charging or discharging of electrical energy may be utilized. As shown, a system 420 (e.g., similar to the system 100 for management of on-demand charging or discharging of electrical energy) may be connected to an electric grid 426 (e.g., via an outlet 116 as described with reference to FIG. 1). As a detailed blow-up figure of the system 420 shows, multiple mobile charging apparatus 422 may be gathered at, e.g., a parking lot or hub to connect to the electric grid 426 and form a mini "power plant" which provides energy to the electric grid (reducing or eliminating a need for, e.g., a higher-cost temporary power plant needed to stabilize the electric grid, promoting "green" power, and potentially lowering a total cost of power from the electric grid).

Figure 5:
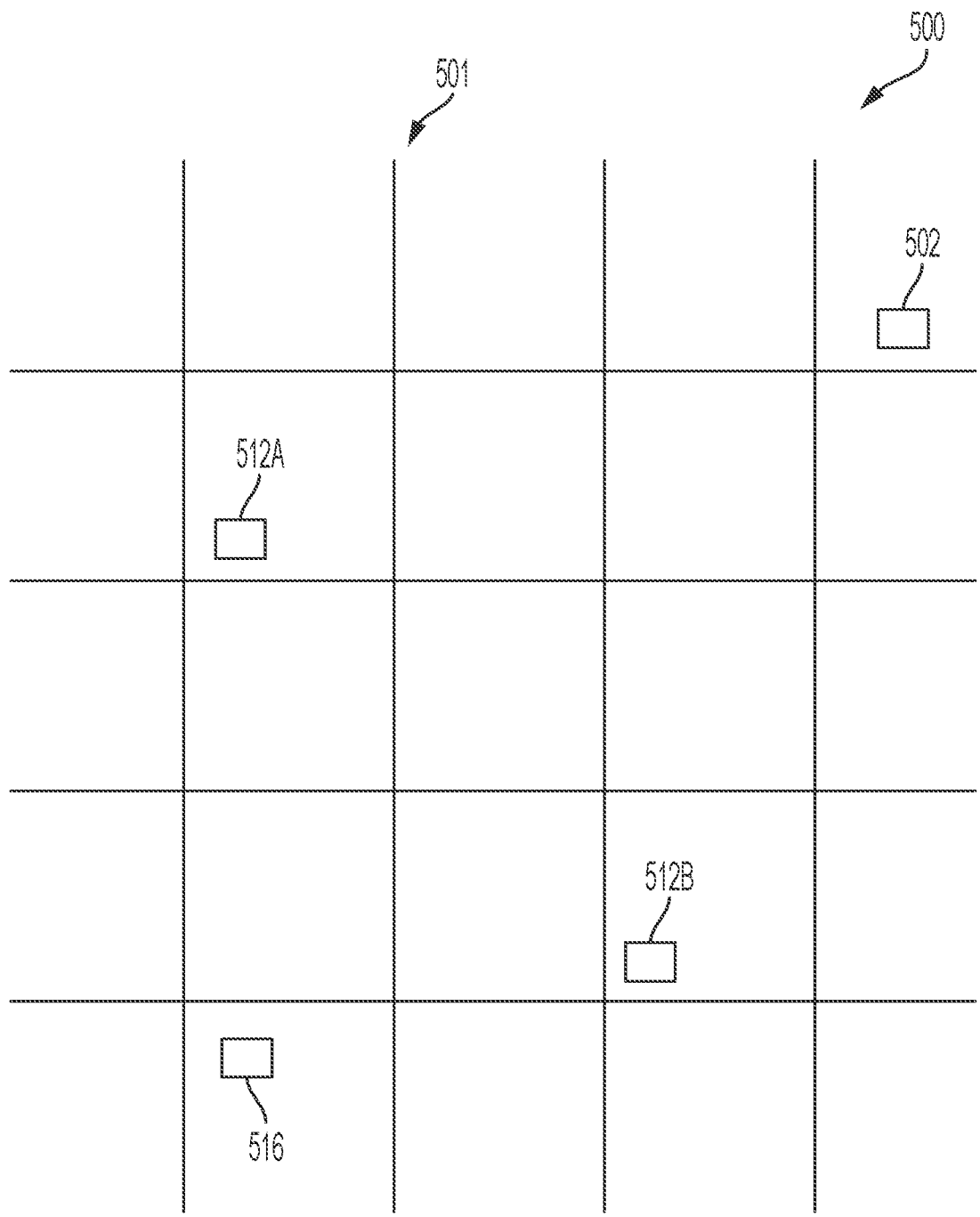
FIG. 5 is an illustration of an example scenario in which a vehicle including a system for management of on-demand charging or discharging of electrical energy may be utilized according to an embodiment of the present invention.

FIG. 5 is an illustration of an example scenario 500 in which a vehicle including a system for management of on-demand charging or discharging of electrical energy may be utilized. Specifically, a mobile charging apparatus 502 may provide the on-demand electrical energy charging or discharging service described herein to at least a first external device 512A and a second external device 512B. As shown, the mobile charging apparatus 502, the first external device 512A, and the second external device 512B may be located at various locations of an area (e.g., indicated by a plurality of intersecting roads 501). As described herein, the mobile charging apparatus 502 may determine an optimized route to service the first and the second external devices 512A and 512B (e.g., to collect excess energy therefrom) and travel to a location 516 to connect to an electric grid to provide the collected excess energy to the electric grid. In some embodiments, the mobile charging apparatus 502 may, based on the determined optimized route, travel along the determined route on various portions of the roads 501 to reach the first and the second external devices 512A and 512B and then eventually the location 516—without needing to refill energy and/or while traveling a least possible distance and/or utilizing a least possible amount of energy (e.g., when compared to various other potential paths for servicing the first and the second external devices 512A and 512B as determined by the mobile charging apparatus 502). In some embodiments, the determined optimized route may also be based on a time required for the on-demand electrical energy charging or discharging service being kept below a threshold time requirement—i.e., minimized. The time required for the on-demand electrical energy charging or discharging service may be determined based on, e.g., SOC information as well as other charging related information including, e.g., charge rates and initial hand-shakes such as voltage confirmation, current limits, and charge start/stop/pause. Then, the mobile charging apparatus 502 may connect to the electric grid and offload the collected excess energy to the electric grid.

Figure 6:
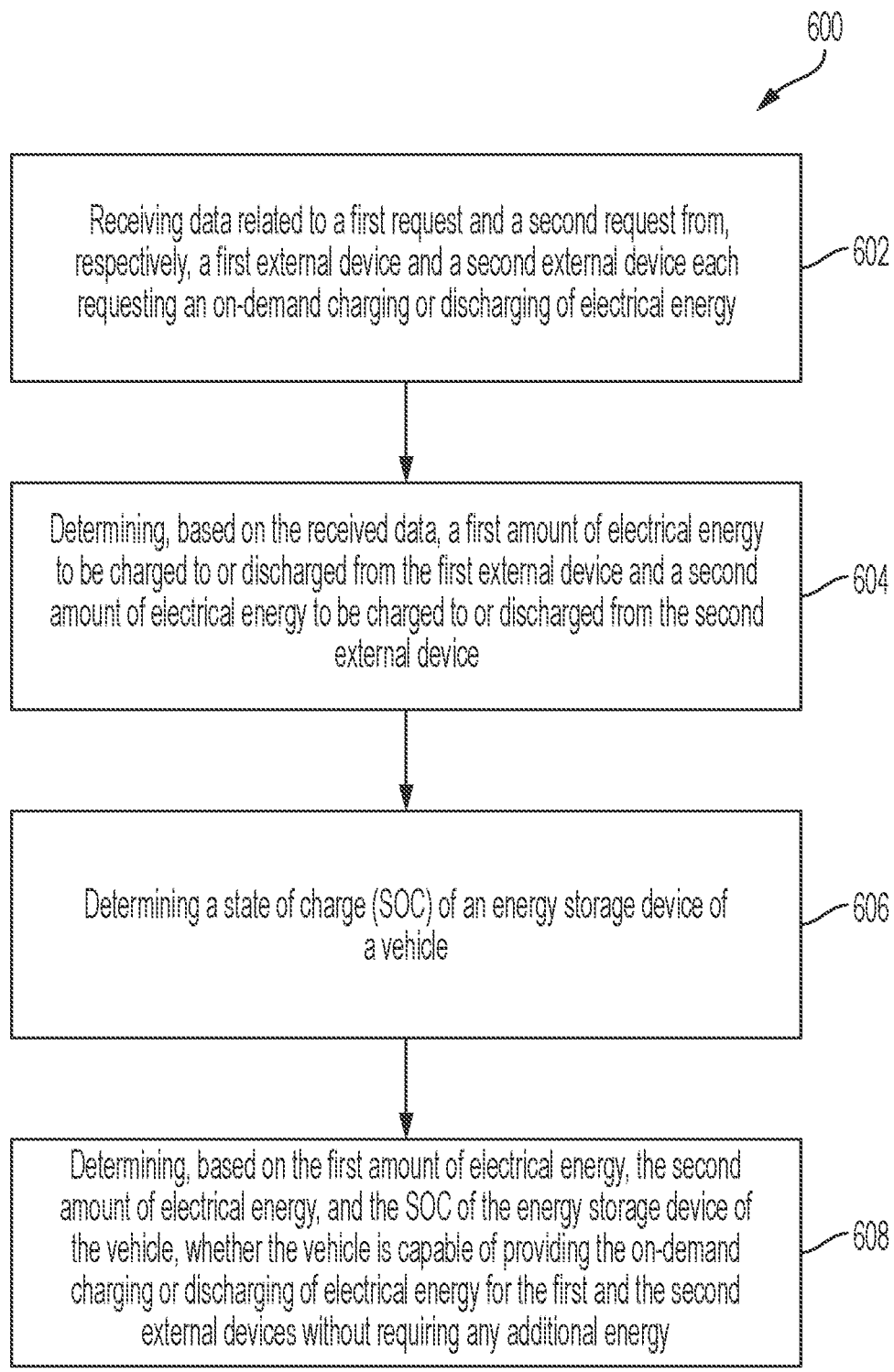
FIG. 6 is a flowchart illustrating a method for management of on-demand charging or discharging of electrical energy according to an embodiment of the present invention.

FIG. 6 is a flowchart illustrating a method 600 for management of on-demand charging or discharging of electrical energy. The method includes receiving data related to a first request and a second request from, respectively, a first external device and a second external device each requesting an on-demand charging or discharging of electrical energy (step 602). Then, the systems and apparatus disclosed herein may determine, based on the received data, a first amount of electrical energy to be charged to or discharged from the first external device and a second amount of electrical energy to be charged to or discharged from the second external device (step 604). Further, the method 600 includes determining an SOC of an energy storage device of a vehicle such as a mobile charging apparatus described herein (step 606). In some embodiments, the energy storage device SOC status (as well as any other relevant status) of the vehicle may be determined or confirmed by information communicated through a physical communications network such as provided by CAN (Controller Area Network). Then, the systems and apparatus disclosed herein may determine, based on the first amount of electrical energy, the second amount of electrical energy, and the SOC of the energy storage device of the vehicle, whether the vehicle is capable of providing the on-demand charging or discharging of electrical energy for the first and the second external devices without requiring any additional electrical energy (step 608).

In some embodiments, the method 600 may also include determining a route for providing the on-demand charging or discharging of electrical energy for the first and the second external devices, such that the vehicle may be capable of traversing the route without an external power supply, as described herein with reference to, e.g., FIG. 2. As described herein, it would be apparent to one of ordinary skill in the art that more than one external device may be serviced simultaneously and/or any number of external devices may be serviced in various embodiments.

The example mobile charging apparatus disclosed herein may provide power to an off-grid load (e.g., an electronic device, an appliance, a fuel-efficient vehicle), which may be disposed, e.g., within the fuel-efficient vehicle, a portable power station, or the like.

While not shown, additional examples of scenarios where the on-demand charging or discharging of electrical energy described herein may be utilized include musical instruments, a construction site, lawn care, motorcycle, ATVs (All-Terrain Vehicles), boats, tailgating, outdoor recreational lighting, stationary systems (for security, surveillance, monitoring, emergency services, remote cabin, or the like), etc.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for managing on-demand discharging of electrical energy by a service apparatus, the system comprising:
   a plurality of energy storage devices configured to store electrical energy;
   one or more connectors configured to electrically connect with at least a first external device;
   a switching device configured to control a connection between the plurality of energy storage devices and the one or more connectors; and
   an electronic control unit (ECU) electrically connected to the switching device and configured to:
      receive data relating to the first external device requesting an on-demand discharging of electrical energy and indicating an amount of electrical energy to be discharged from the first external device, and
      determine whether the service apparatus is capable of receiving the on-demand discharging of electrical energy from the first external device.

2. The system of claim 1, wherein the ECU is further configured to determine a route for providing the on-demand discharging of electrical energy from the first external device; and
   wherein the service apparatus is capable of traversing the route without an external power supply.

3. The system of claim 2, wherein the ECU is further configured to utilize at least a portion of the electrical energy to be discharged from the first external device to power the service apparatus, the portion of the electrical energy enabling the service apparatus to traverse the route without the external power supply.

4. The system of claim 1, wherein the one or more connectors are further configured to connect with a plug of a second external device; and
   wherein the ECU is further configured to receive a request for an on-demand discharging of electrical energy from the second external device to be performed simultaneously as the on-demand discharging of electrical energy from the first external device.

5. The system of claim 1, further comprising a network access device configured to communicate with a remote device providing one or more instructions related to the on-demand discharging of electrical energy from the first external device; and
   wherein the ECU is further configured to receive, via the network access device and from the remote device, the one or more instructions related to the on-demand discharging of electrical energy from the first external device.

6. The system of claim 1, further comprising a plurality of receptacles each removably disposed within the service apparatus; and
   wherein:
      the plurality of energy storage devices include a plurality of stackable energy storage devices, and
      each of the plurality of receptacles are detachable from one another of the plurality of receptacles and configured to house a respective one of the plurality of stackable energy storage devices.

7. The system of claim 1, further comprising a connector configured to connect with an electric grid; and
   wherein the ECU is further configured to provide, via the connector, electrical energy to the electric grid.

8. A system for managing on-demand charging or discharging of electrical energy by a service apparatus, the system comprising:
   a plurality of energy storage devices configured to store electrical energy;
   one or more connectors configured to connect with at least a first external device and a second external device;
   a switching device configured to control an electrical connection between the plurality of energy storage devices and the one or more connectors; and
   an electronic control unit (ECU) electrically connected to the switching device and configured to:
      receive data relating to the first external device and the second external device each requesting an on-demand charging or discharging of electrical energy and indicating a first amount of electrical energy and a second amount of electrical energy to be charged to or discharged from, respectively, the first external device and the second external device, and
      determine whether the service apparatus is capable of providing the on-demand charging or discharging of electrical energy for the first and the second external devices simultaneously without requiring any additional electrical energy or any additional electrical energy storage capacity based on the received data.

9. The system of claim 8, wherein the ECU is further configured to determine a route for providing the on-demand charging or discharging of electrical energy for the first and the second external devices; and
   wherein the service apparatus is capable of traversing the route without an external power supply.

10. The system of claim 9, wherein the requests from the first external device and the second external device include a request for an on-demand discharging of electrical energy from at least one of the first external device or the second external device; and
  wherein the ECU is further configured to utilize at least a portion of the electrical energy to be discharged from the at least one of the first external device or the second external device to power the service apparatus, the portion of the electrical energy enabling the service apparatus to traverse the route without the external power supply.

11. The system of claim 8, wherein the ECU is further configured to receive a request for an on-demand charging or discharging of electrical energy for at least a third external device to be performed simultaneously as the on-demand charging or discharging of electrical energy for at least one of the first external device or the second external device.

12. The system of claim 8, further comprising a network access device configured to communicate with a remote device providing one or more instructions related to the on-demand charging or discharging of electrical energy for the first and the second external devices; and
  wherein the ECU is further configured to:
    receive, via the network access device and from the remote device, the one or more instructions related to the on-demand charging or discharging of electrical energy for the first and the second external devices, and
    receive, via the network access device, an initial hand-shake relating to at least one of voltage confirmation, a current limit, or a charge start, stop, or pause.

13. The system of claim 8, wherein the service apparatus is an autonomously driven vehicle.

14. A method for managing on-demand discharging of electrical energy, the method comprising:
  receiving data related to a first request and a second request from, respectively, a first external device and a second external device each requesting an on-demand discharging of electrical energy;
  determining, based on the received data, a first amount of electrical energy to be discharged from the first external device and a second amount of electrical energy to be discharged from the second external device;
  determining a state of charge (SOC) of an energy storage device of a vehicle; and
  determining, based on the first amount of electrical energy, the second amount of electrical energy, and the SOC of the energy storage device of the vehicle, whether the vehicle is capable of providing the on-demand discharging of electrical energy from the first and the second external devices without requiring any additional electrical energy storage capacity.

15. The method of claim 14, further comprising determining a route for providing the on-demand discharging of electrical energy from the first and the second external devices such that the vehicle is capable of traversing the route without an external power supply.

16. The method of claim 15, wherein the vehicle is configured to utilize at least a portion of the electrical energy to be discharged from the first external device or the second external device to power the vehicle, the portion of the electrical energy configured to be stored on the energy storage device of the vehicle and enable the vehicle to traverse the route without the external power supply.

17. The method of claim 14, further comprising:
  receiving a request for an on-demand discharging of electrical energy for at least a third external device to be performed simultaneously as the on-demand discharging of electrical energy for at least one of the first external device or the second external device; and
  providing the on-demand discharging of electrical energy from the at least third external device simultaneously as the on-demand discharging of electrical energy for the at least one of the first external device or the second external device.

18. The method of claim 14, further comprising receiving, via a network access device, an initial hand-shake relating to at least one of voltage confirmation or a current limit; and
  wherein the receiving the data related to the first request and the second request includes receiving, via the network access device and from a remote server or a user device, the data related to the first request and the second request.

19. The method of claim 14, further comprising:
  providing electrical energy discharged from at least one of the first external device or the second external device to an electric grid.

20. The system of claim 8, wherein the ECU is further configured to determine a state of charge (SOC) of an energy storage device of the plurality of energy storage devices; and
  wherein determining whether the service apparatus is capable of providing the on-demand charging or discharging of electrical energy for the first and the second external devices simultaneously without requiring any additional electrical energy or any additional electrical energy storage capacity is further based on the SOC of the energy storage device.

* * * * *